(12) United States Patent
Mishina et al.

(10) Patent No.: US 10,775,870 B2
(45) Date of Patent: Sep. 15, 2020

(54) SYSTEM AND METHOD FOR MAINTAINING CACHE COHERENCY

(71) Applicant: FUJITSU LIMITED, Kawasaki-shi, Kanagawa (JP)

(72) Inventors: Takeshi Mishina, Kawasaki (JP); Hideki Sakata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/972,523

(22) Filed: May 7, 2018

(65) Prior Publication Data

US 2018/0335829 A1    Nov. 22, 2018

(30) Foreign Application Priority Data

May 19, 2017    (JP) .................................. 2017-099969

(51) Int. Cl.
  *G06F 12/08*    (2016.01)
  *G06F 1/3234*   (2019.01)
  (Continued)

(52) U.S. Cl.
  CPC .............. *G06F 1/3275* (2013.01); *G06F 1/32* (2013.01); *G06F 11/3037* (2013.01);
  (Continued)

(58) Field of Classification Search
  CPC .............. G06F 12/0802; G06F 12/0815; G06F 12/0831
  (Continued)

(56) References Cited

U.S. PATENT DOCUMENTS 5,829,032 A    10/1998  Komuro et al.
6,298,418 B1 * 10/2001  Fujiwara ............. G06F 12/0833
                                                         711/144
(Continued)

FOREIGN PATENT DOCUMENTS

JP    8-185359     7/1996
JP    10-161930    6/1998

OTHER PUBLICATIONS

Espacenet English Abstract for Japanese Publication No. 8-185359, published Jul. 16, 1996.

(Continued)

*Primary Examiner* — Than Nguyen
(74) *Attorney, Agent, or Firm* — Staas & Halsey LLP

(57) ABSTRACT

A processing device includes multiple processing units and multiple memory devices respectively assigned to the multiple processing units. Each of the multiple processing units includes a cache memory configured to retain data stored in the memory device assigned to itself, and fetched data taken out from the memory device of the processing unit other than itself. When an access request for the fetched data is received from a source processing unit from which the fetched data has been taken out, the cache memory determines occurrence of a crossing in which the access request is received after the cache memory issues write back information instructing to write back the fetched data to the memory device assigned to the source processing unit. If the crossing has occurred, crossing information indicating that the crossing has occurred is output as a response to the access request.

4 Claims, 8 Drawing Sheets

(51) Int. Cl.
  *G06F 12/06*      (2006.01)
  *G06F 11/30*      (2006.01)
  *G06F 12/0815*    (2016.01)
  *G06F 1/32*       (2019.01)
  *G06F 12/0831*    (2016.01)

(52) U.S. Cl.
  CPC ...... *G06F 12/0646* (2013.01); *G06F 12/0815* (2013.01); *G06F 12/0831* (2013.01); *G06F 2212/1024* (2013.01)

(58) Field of Classification Search
  USPC ........................................................ 711/143
  See application file for complete search history.

(56) References Cited

U.S. PATENT DOCUMENTS

2014/0006716 A1\* 1/2014 Steeley, Jr. ........... G06F 15/167
                                                    711/130
2015/0178210 A1\* 6/2015 Beers ................. G06F 12/0831
                                                    711/135

OTHER PUBLICATIONS

Espacenet English Abstract for Japanese Publication No. 10-161930, published Jun. 19, 1998.

\* cited by examiner

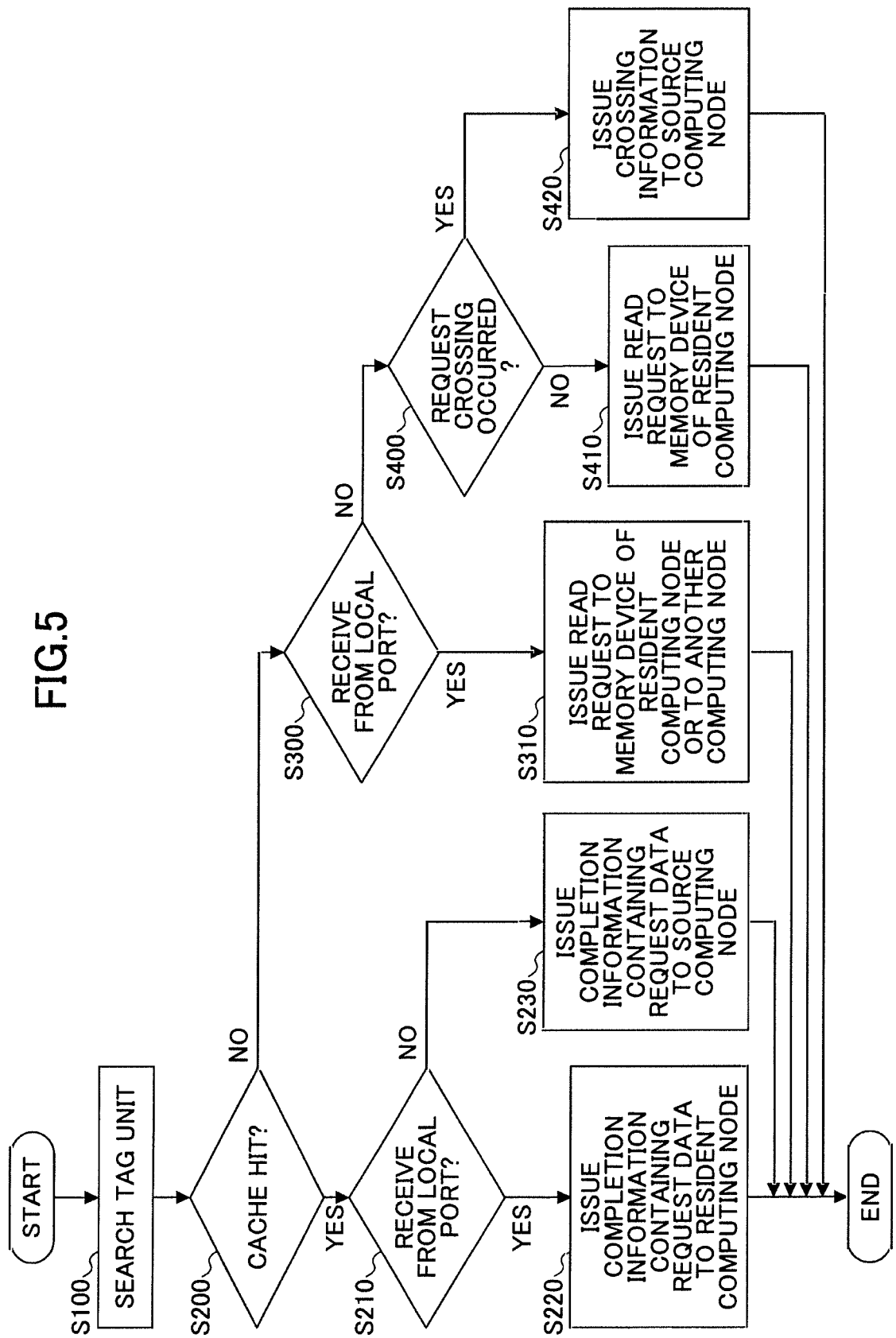

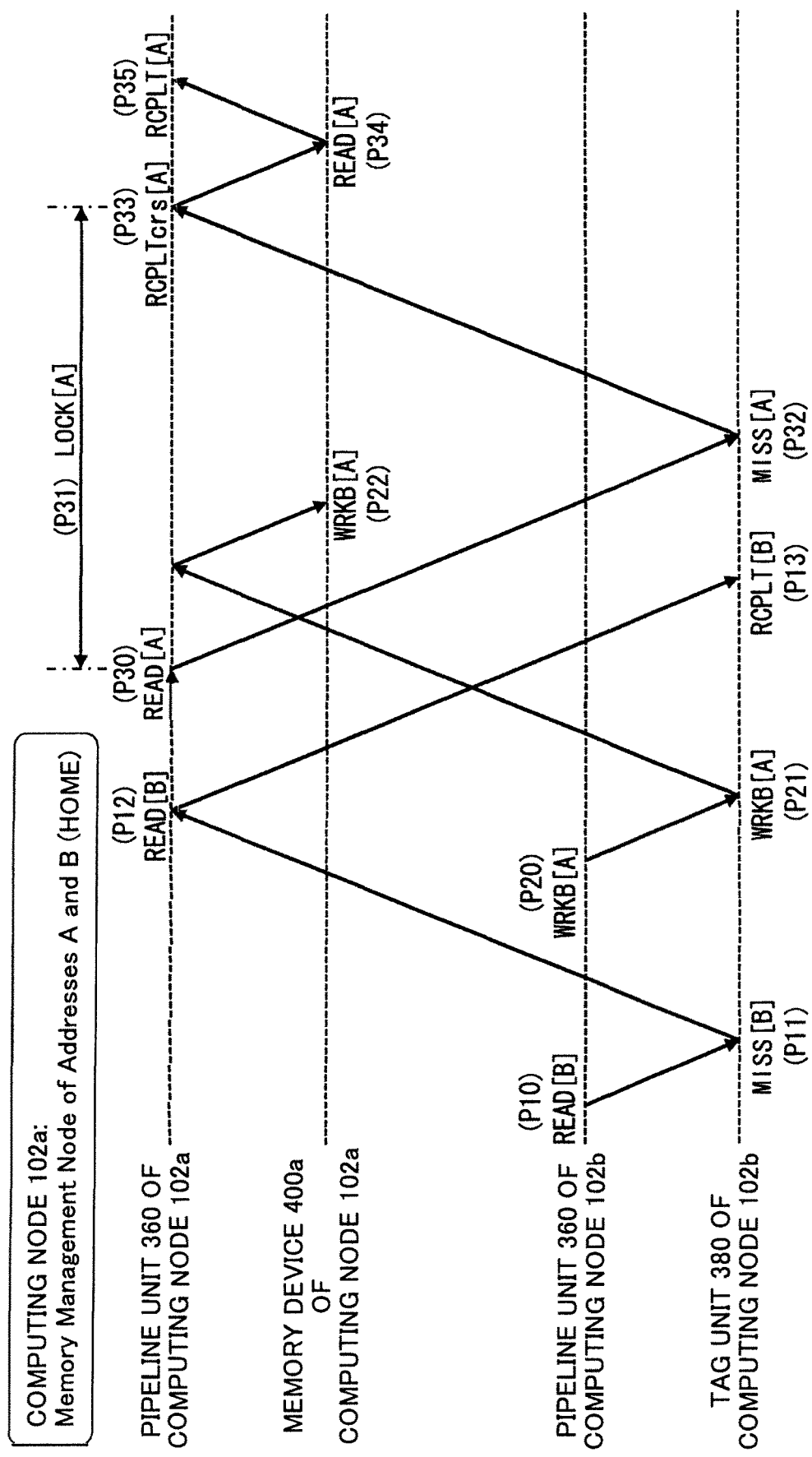

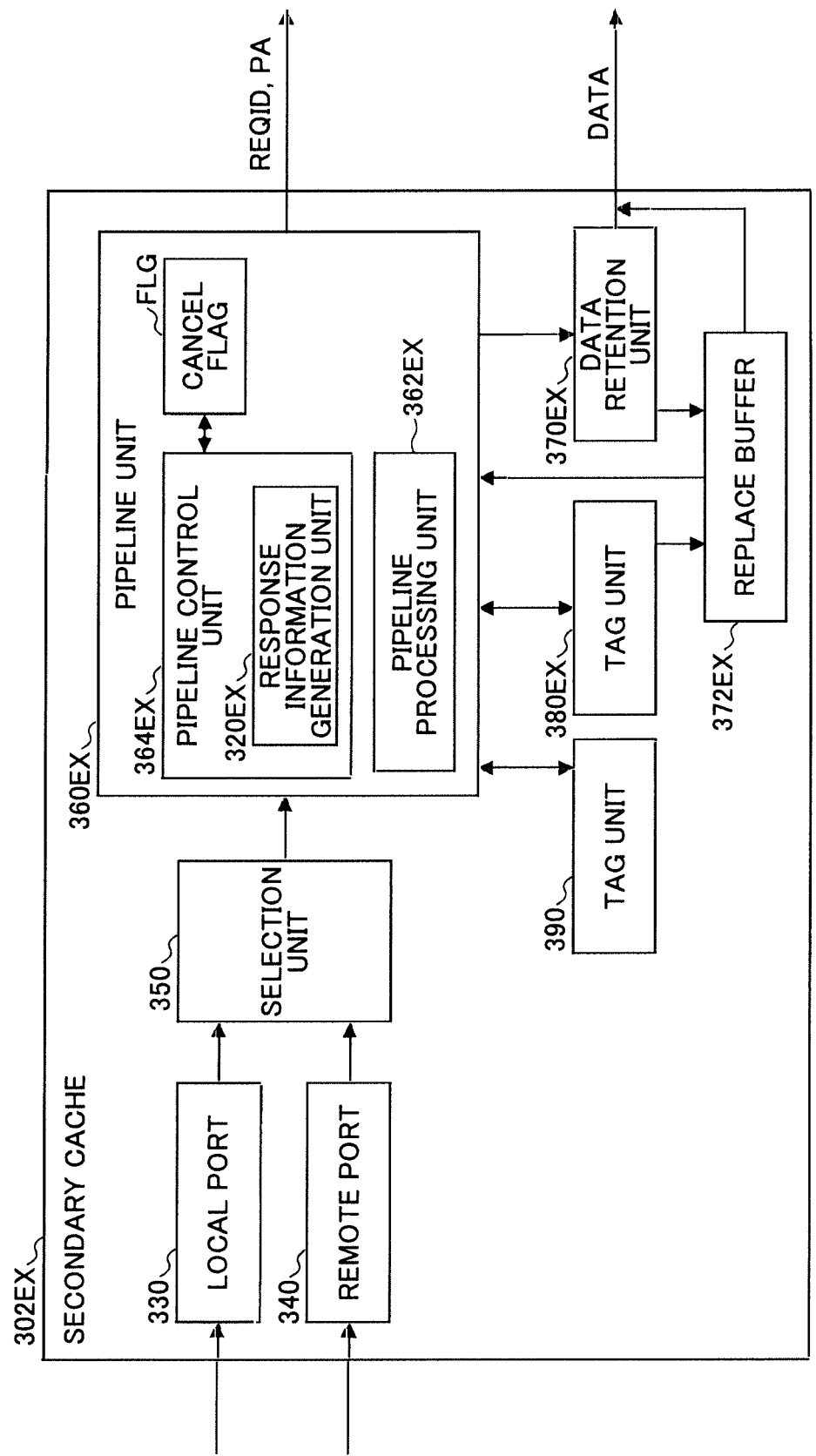

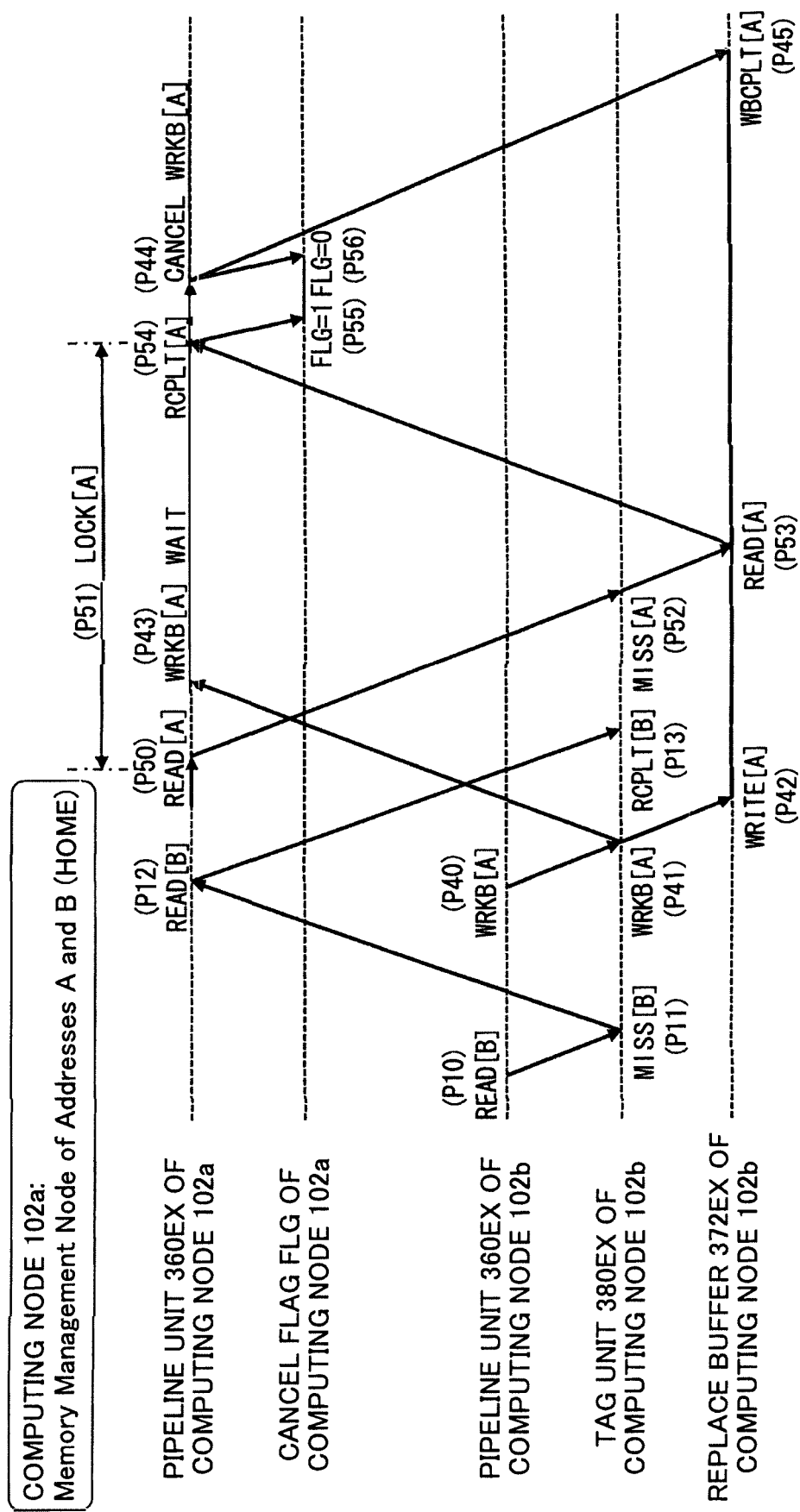

SYSTEM AND METHOD FOR MAINTAINING CACHE COHERENCY

CROSS-REFERENCE TO RELATED APPLICATION

This application is based upon and claims the benefit of priority of the prior Japanese Patent Application No. 2017-099969, filed on May 19, 2017, the entire contents of which are incorporated herein by reference.

FIELD

The embodiments discussed herein relate to a processing system and a control method of a processing system.

BACKGROUND

A processing system including multiple computing nodes is widely used. Each of the computing nodes in the processing system includes a processor core acting as a process execution part for performing arithmetic operations, and a cache memory that is more quickly accessible than a main memory for storing data. The cache memory is placed between the processor core and the main memory, and retains part of data stored in the main memory. Each computing node performs cache coherency control to maintain data consistency stored in each cache memory (e.g. cache coherency).

For instance, in a multiprocessor system including multiple main memories and multiple processors each containing cache memory, a method for performing cache coherency control is proposed by referring to tag information of the main memory (see Patent Document 1, for example). The tag information of the main memory is information indicating, for each data group corresponding to a cache line, if a dirty cache line exists in a processor other than a processor corresponding to the main memory, and is stored in a tag memory provided in each main memory. The "dirty" is a state of the cache memory whose data is updated but the data in the main memory has not been updated. For example, when data in the main memory, corresponding to certain tag information whose state is dirty, is to be read, a write-back operation to write a dirty cache line to the main memory is performed, and correct data is sent to a request source processer after completing the write-back operation.

Further, in a multiprocessor system including multiple processors sharing a main memory, a cache coherency control method is proposed to read correct data even when a read request is targeted to data in which a write-back operation is being performed (see Patent Document 2, for example). In such a cache coherency control method, when a read request targeted to data in which a write-back operation is being performed is issued, on receiving a completion notice from a main memory indicating that the write-back operation is completed, a read request is again issued to the main memory.

The following is a reference document:
[Patent Document 1] Japanese Laid-Open Patent Publication No. 8-185359,
[Patent Document 2] Japanese Laid-Open Patent Publication No. 10-161930.

SUMMARY

According to an aspect of the embodiments, a processing device includes multiple processing units and multiple memory devices respectively assigned to the multiple processing units. Each of the multiple processing units includes a process execution unit configured to perform an arithmetic operation, and a cache memory configured to retain data stored in the memory device assigned to a same processing unit in which the cache memory resides, and to retain fetched data taken out from the memory device of the processing unit other than the same processing unit. The cache memory includes a determination unit and a response information generation unit. When an access request of the fetched data is received from a source processing unit from which the fetched data has been taken out, the determination unit determines occurrence of a crossing in which the access request is received after the cache memory issues write back information instructing to write back the fetched data to the memory device assigned to the source processing unit. If the crossing has occurred, the response information generation unit outputs crossing information indicating that the crossing has occurred, as a response to the access request, to the source processing unit.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 5 is a diagram illustrating an example of an operation of the processing system illustrated in FIG. 3;

FIG. 6 is a diagram illustrating an example of an operation of the processing system when a request crossing has occurred;

FIG. 7 is a diagram illustrating a comparative example of the secondary cache illustrated in FIG. 4; and FIG. 8 is a diagram illustrating an example of an operation of a processing system including the secondary cache illustrated in FIG. 7.

DESCRIPTION OF EMBODIMENT

Hereinafter, embodiments of the present disclosure will be described with reference to the drawings.

One way to reduce power consumption of a processing system is, to reduce an area of a circuit other than a processor core, which does not undesirably affect processing performance. For example, by reducing an area of a circuit implementing cache coherency control, power consumption of a processing system can be reduced.

In one aspect, the present disclosure aims at reducing an area of a circuit corresponding to cache coherency control in a processing system, to reduce power consumption of the processing system.

Figure 1:
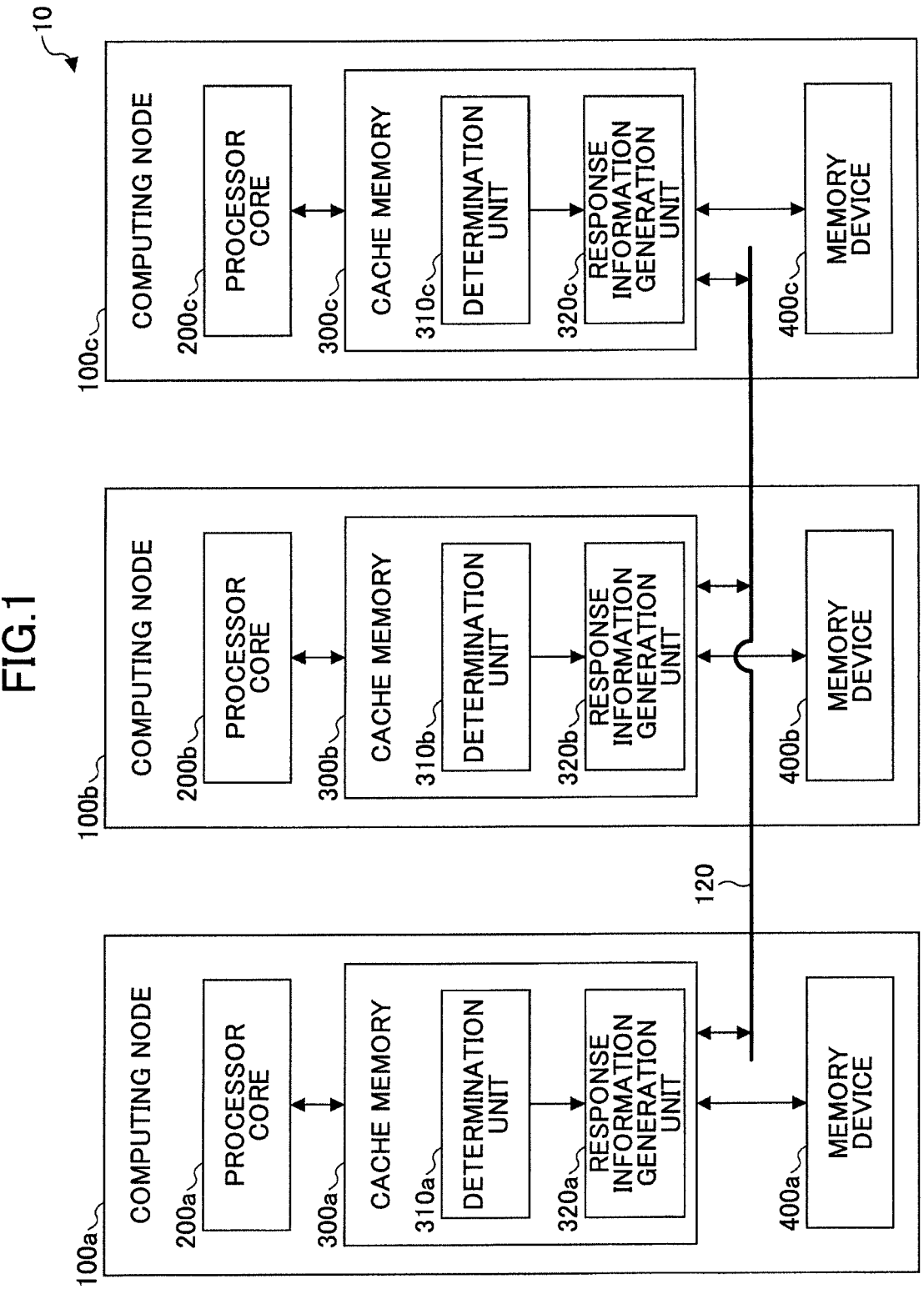
FIG. 1 is a diagram illustrating one embodiment of a processing system and a control method of the processing system.

FIG. 1 is a diagram illustrating one embodiment of a processing system and a control method of the processing system. The processing system 10 illustrated in FIG. 1 is a processor such as a CPU (Central Processing Unit). The processing system 10 includes multiple computing nodes 100 (100a, 100b, and 100c), multiple memory devices 400 (400a, 400b, and 400c) respectively assigned to the computing nodes 100 (100a, 100b, and 100c), and a bus 120 connecting the computing nodes 100. In the following, a given memory device 400 assigned to a given computing node 100 may be referred to as a "(given) memory device 400 of a (given) computing node 100". The multiple computing nodes 100 are an example of multiple processing units to which multiple memory devices 400 are assigned respectively. Note that the number of the computing nodes 100 is not limited to 3.

In FIG. 1, to distinguish each of the multiple computing nodes 100 in describing the processing systems 10 or the like, a reference number followed by a lower case letter of an alphabetic character (such as a, b, or c) is used as a reference symbol for each of the multiple computing nodes 100. Also, with respect to a reference symbol assigned to each element included in the computing node 100, a same alphabetic character as the alphabetic character assigned to the computing node 100 is attached as a suffix of the reference symbol.

Each of the computing nodes 100 includes a processor core 200 such as a CPU core performing an arithmetic operation, a cache memory 300, and a memory device 400 for storing information such as data used by the processor core 200. The processor core 200 is an example of a process execution unit performing arithmetic operation.

The cache memory 300 is accessible faster than the memory device 400, and stores data used by the processor core 200 of the same computing node 100 in which the cache memory 300 resides (hereinafter, to specify a computing node among multiple computing nodes 100, a computing node in which the cache memory 300 resides may be referred to as a "resident computing node"). Further, the cache memory 300 included in each of the computing nodes 100 is connected to the bus 120, and each of the cache memories 300 is communicable with each other. For example, data stored in the memory device 400 of each computing node 100 is taken out to at least one of the other computing nodes 100 via the cache memory 300 and the bus 120. The cache memory 300 of each computing node 100 manages status of data stored in the memory device 400 of the resident computing node 100. Data stored in the memory device 400 has one of the following states: an exclusive state in which data is taken out to only one of the other computing nodes 100, a shared state in which data is taken out to one or more of the other computing nodes 100 and data is not updated, an invalid state in which data is not taken out to the other computing nodes 100, and the like. Note that the exclusive state does not necessarily mean that data is not updated.

As described above, the cache memory 300 stores data in the memory device 400 of the resident computing node 100 and fetched data that is taken out from the memory device 400 of the other computing nodes 100 among the multiple computing nodes 100. That is, the cache memory 300 retains data that is stored in one of the multiple memory devices 400.

When a read request for reading out data is received from the processor core 200, the cache memory 300 transmits data requested by the read request to the processor core 200. When the data requested by the read request is not stored in the cache memory 300 (when cache miss has occurred in the cache memory 300), the cache memory 300 issues a read request to the memory device 400 or the like.

For example, when the cache memory 300a receives a read request for reading data in the memory device 400b of another computing node 100b, the cache memory 300a issues a read request to the cache memory 300b of the computing node 100b via the bus 120. Subsequently, if data requested by the read request from the computing node 100a is not in the cache memory 300b, the cache memory 300b issues a read request to the memory device 400b of the computing node 100b. As described above, the processor core 200a of the computing node 100a accesses the memory device 400b of the computing node 100b via the cache memory 300a of the computing node 100a, the bus 120, and the cache memory 300b of the computing node 100b. In this case, data stored in the memory device 400b of the computing node 100b is transmitted to the processor core 200a of the computing node 100a via the cache memory 300b of the computing node 100b, the bus 120, and the cache memory 300a of the computing node 100a.

Further, for example, when the cache memory 300a receives a read request for reading data that is taken out from the memory device 400a of the resident computing node 100a to only another computing node 100c, the cache memory 300a issues a read request to the computing node 100c to which the requested data is taken out (hereinafter, a computing node to which requested data is taken out may be referred to as a "fetcher computing node"). For example, the cache memory 300a issues the read request to the cache memory 300c of the computing node 100c via the bus 120. The data retained in the cache memory 300c of the computing node 100c is written back to the memory device 400a of the computing node 100a via the bus 120 and the cache memory 300a of the computing node 100a. Also, the data written back to the memory device 400a of the computing node 100a is transmitted to the processor core 200a of the computing node 100a.

When the cache memory 300 receives a read request for reading data that is not taken out from the memory device 400 of the resident computing node 100 to another computing node 100, the cache memory 300 issues a read request to the memory device 400 of the resident computing node 100.

As described above, a communication between multiple computing nodes 100 is performed via the cache memory 300 and the bus 120. Further, data stored in any one of the memory devices 400 can be retained into any cache memories 300. Therefore, each computing node 100 performs cache coherency control for maintaining data consistency (cache coherency) of data retained in each cache memory 300.

For example, the cache memory 300 includes a determination unit 310 for determining if a request crossing occurs with respect to fetched data, and a response information generation unit 320 for generating crossing information based on a determination result of the determination unit 310. An example of the request crossing includes the following case: after the cache memory 300 issues write back information instructing to write fetched data back to the memory device 400 of a computing node 100 from which the fetched data was taken out (hereinafter, the computing node from which the fetched data was taken out may be referred to as a "source computing node"), the cache memory 300 receives an access request for the fetched data. The access request mentioned here is a write request for writing data into the memory device 400, or a read request.

For example, when the cache memory 300a receives, from the computing node 100b, an access request for fetched data that is taken from the memory device 400b of the computing node 100*b*, a determination unit 310*a* of the cache memory 300*a* determines if a request crossing has occurred or not. In this case, the determination unit 310*a* determines if the access request for the fetched data is received from the computing node 100*b* after write back information instructing to write the fetched data back to the memory device 400*b* of the computing node 100*b* has been issued to the computing node 100*b*. For example, if the fetched data requested by the access request is not retained in the cache memory 300*a*, the determination unit 310*a* determines that the request crossing has occurred.

As described above, when an access request for fetched data is received from a source computing node 100 of the fetched data, the determination unit 310 determines if a request crossing with respect to the fetched data has occurred.

When a request crossing with respect to fetched data has occurred, the response information generation unit 320 outputs crossing information indicating that the request crossing has occurred to a source computing node 100 of the fetched data, as a response to the access request.

For example, when the cache memory 300*b* receives, from the cache memory 300*a* of the computing node 100*a*, the crossing information as a response to the access request with respect to fetched data that has been fetched to the computing node 100*a*, the cache memory 300*b* recognizes that a request crossing has occurred. That is, the cache memory 300*b* of the computing node 100*b* recognizes that the latest data requested by the access request has been written back to the memory device 400*b* of the resident computing node 100*b*. For example, in a case in which fetched data taken out from the memory device 400*b* to the computing node 100*a* is updated by the processor core 200*a*, the fetched data stored in the memory device 400*b* does not match the latest fetched data retained by the cache memory 300*a*. In this case, by writing the latest fetched data, which was updated by the processor core 200*a*, back to the memory device 400*b*, the memory device 400*b* stores the latest data updated by the processor core 200*a*. Accordingly, the cache memory 300*b* of the computing node 100*b* reads the latest data (the data requested by the access request) written back from the computing node 100*a* from the memory device 400*b* of the resident computing node 100*b*.

By performing the above process, the computing node 100 having received the crossing information reads out the fetched data (the data requested by the access request) that has been written back to the memory device 400 of the resident computing node 100. Accordingly, even when a request crossing has occurred, cache coherency can be maintained.

As a possible approach for maintaining cache coherency without using crossing information, a configuration of a processing system having a replace buffer may exist. When fetched data is written back to a memory device 400 of a source computing node 100 of the fetched data, the fetched data to be written back and discarded from the cache memory is retained in the replace buffer. When a request crossing occurs with respect to the fetched data to be written back, the cache memory transmits the fetched data retained in the replace buffer to a computing node 100 of an access request source. Because of the above operation, even when a request crossing occurs, cache coherency can be maintained. In a configuration in which the replace buffer is added, a size of a circuit of the processing system becomes larger than the processing system 10 implementing cache coherency control without using a replace buffer. In other words, the processing system 10 implementing cache coherency control using crossing information can prevent a size of a circuit from increasing. Accordingly, the processing system 10 can reduce a size of the circuit.

Note that the configuration of the processing system 10 is not limited to the configuration illustrated in FIG. 1. For example, the computing node 100 (processing unit) does not necessarily include the memory device 400. That is, the multiple memory devices 400 that are to be assigned to the multiple computing nodes 100 respectively may be disposed outside the computing nodes 100 or the processing system 10. Also, in each of the computing nodes 100, another cache memory other than the cache memory 300 may be disposed between the processor core 200 and the cache memory 300.

Figure 2:
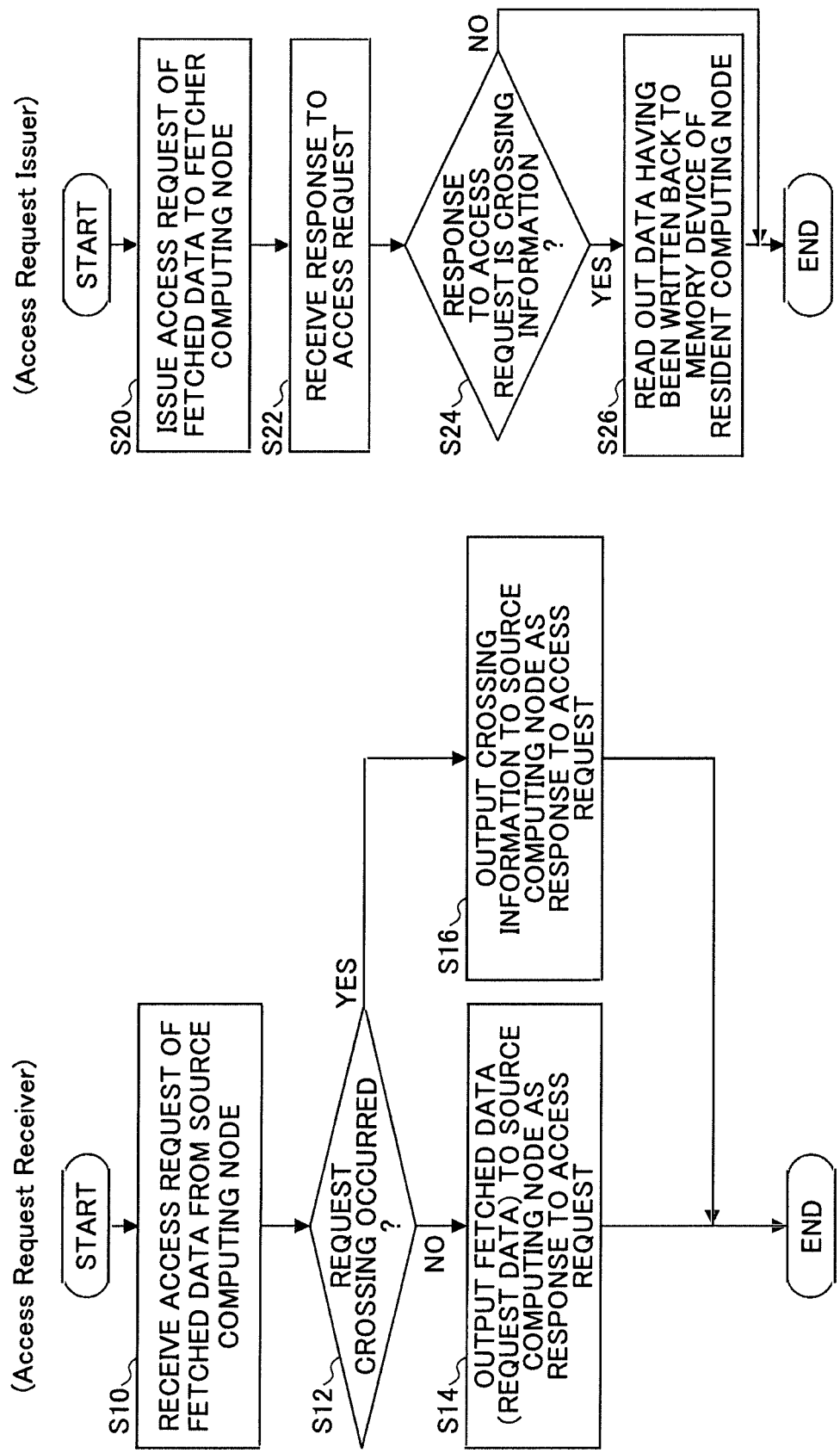
FIG. 2 is a diagram illustrating an example of an operation of the processing system illustrated in FIG. 1.

FIG. 2 is a diagram illustrating an example of an operation of the processing system 10 illustrated in FIG. 1. The operation illustrated in FIG. 2 is an aspect of a control method of the processing system. The operation illustrated in FIG. 2 is an example of an operation of a computing node 100 when accessing fetched data that is taken out to another computing node 100. FIG. 2 illustrates the operation of the computing nodes 100*a* and 100*b* in a case in which an access request, targeted to fetched data taken out from the computing node 100*b* to the computing node 100*a*, is issued from the computing node 100*b* to the computing node 100*a*. In this case, a computing node 100 acting as an access request receiver is the computing node 100*a*, and a computing node 100 acting as an access request issuer is the computing node 100*b*. First, the operation of the access request receiver, which is the computing node 100*a*, will be described.

At step S10, the cache memory 300*a* of the computing node 100*a* receives an access request, targeted to fetched data taken out from the computing node 100*b*, from the cache memory 300*b* of the source computing node 100*b* of the fetched data.

Next, at step S12, the determination unit 310*a* of the cache memory 300*a* determines if a request crossing has occurred. For example, when write back information instructing to write the fetched data back to the memory device 400*b* has been output to the computing node 100*b* before receiving the access request targeted to the fetched data from the computing node 100*b*, the determination unit 310*a* determines that a request crossing has occurred.

As describe above, when the access request targeted to the fetched data is received from the computing node 100*b* from which the fetched data is taken out, the determination unit 310*a* determines if a request crossing has occurred. If a request crossing has occurred, that is, if the fetched data has already been discarded from the cache memory 300*a*, the operation of the computing node 100*a* proceeds to step S16. If a request crossing has not occurred, that is, if the cache memory 300*a* retains the fetched data, the operation of the computing node 100*a* proceeds to step S14.

At step S14, the cache memory 300*a* outputs the fetched data that is retained in the cache memory 300*a* (which is a request data requested by the access request) to the source computing node 100*b*, as a response to the access request of the fetched data. Next, the cache memory 300*a* discards the fetched data sent to the computing node 100*b*, from the cache memory 300*a*, and the process of the computing node 100*a* having received the access request targeted to the fetched data from the computing node 100*b* terminates. Because a request crossing has not occurred at step S14, cache coherency is maintained.

At step S16, the response information generation unit 320*a* of the cache memory 300*a* outputs crossing information indicating that a request crossing has occurred to the source computing node 100b, as a response to the access request of the fetched data. And, the process of the computing node 100a having received the access request with respect to the fetched data from the computing node 100b terminates. Next, the operation of the access request issuer, which is the computing node 100b, will be described.

At step S20, the cache memory 300b of the computing node 100b issues an access request, targeted to fetched data taken out from the resident computing node 100b, to the fetcher computing node 100a to which the fetched data is taken out.

Next, at step S22, the cache memory 300b receives a response to the access request for the fetched data from the computing node 100a which is a destination of the access request.

Next, at step S24, the cache memory 300b determines if the response to the access request is crossing information or not. If the response to the access request is crossing information, the operation of the computing node 100b proceeds to step S26. If the response to the access request is not crossing information, that is, if the computing node 100b receives the fetched data (request data) as the response to the access request, the process of the computing node 100b with respect to the access request terminates.

At step S26, the cache memory 300b reads out the fetched data (the latest request data) that has been written back from the computing node 100a to the memory device 400b of the resident computing node 100b. Accordingly, because the cache memory 300b of the computing node 100b can access correct data even when a request crossing has occurred, cache coherency can be maintained. Note that the operation of the processing system 10 is not limited to the example illustrated in FIG. 2.

As described above, in the embodiment illustrated in FIG. 1 and FIG. 2, the determination unit 310 of the cache memory 300 determines if a request crossing with respect to fetched data has occurred. Also, the response information generation unit 320 of the cache memory 300 outputs crossing information indicating that a request crossing has occurred to a computing node 100 of an access request issuer (that is, a source computing node 100 of the fetched data). As the above operation is performed, the computing node 100 of an access request issuer can recognize that a request crossing has occurred with respect to data requested by the access request, and can read the latest data (correct data) from the memory device 400 of the same computing node 100. As a result, cache coherency can be maintained even when a request crossing has occurred.

Further, by performing cache coherency control using crossing information, a size of a circuit for cache coherency control can be reduced as compared to a case in which a replace buffer is used for cache coherency control. That is, a size of a circuit of the processing system 10 supporting cache coherency control can be reduced. Also, because a size of a circuit for cache coherency control is reduced, power consumption of the processing system 10 can be reduced. Also, because a size of a circuit for cache coherency control is reduced, a manufacturing cost of the processing system 10 can be reduced.

Figure 3:
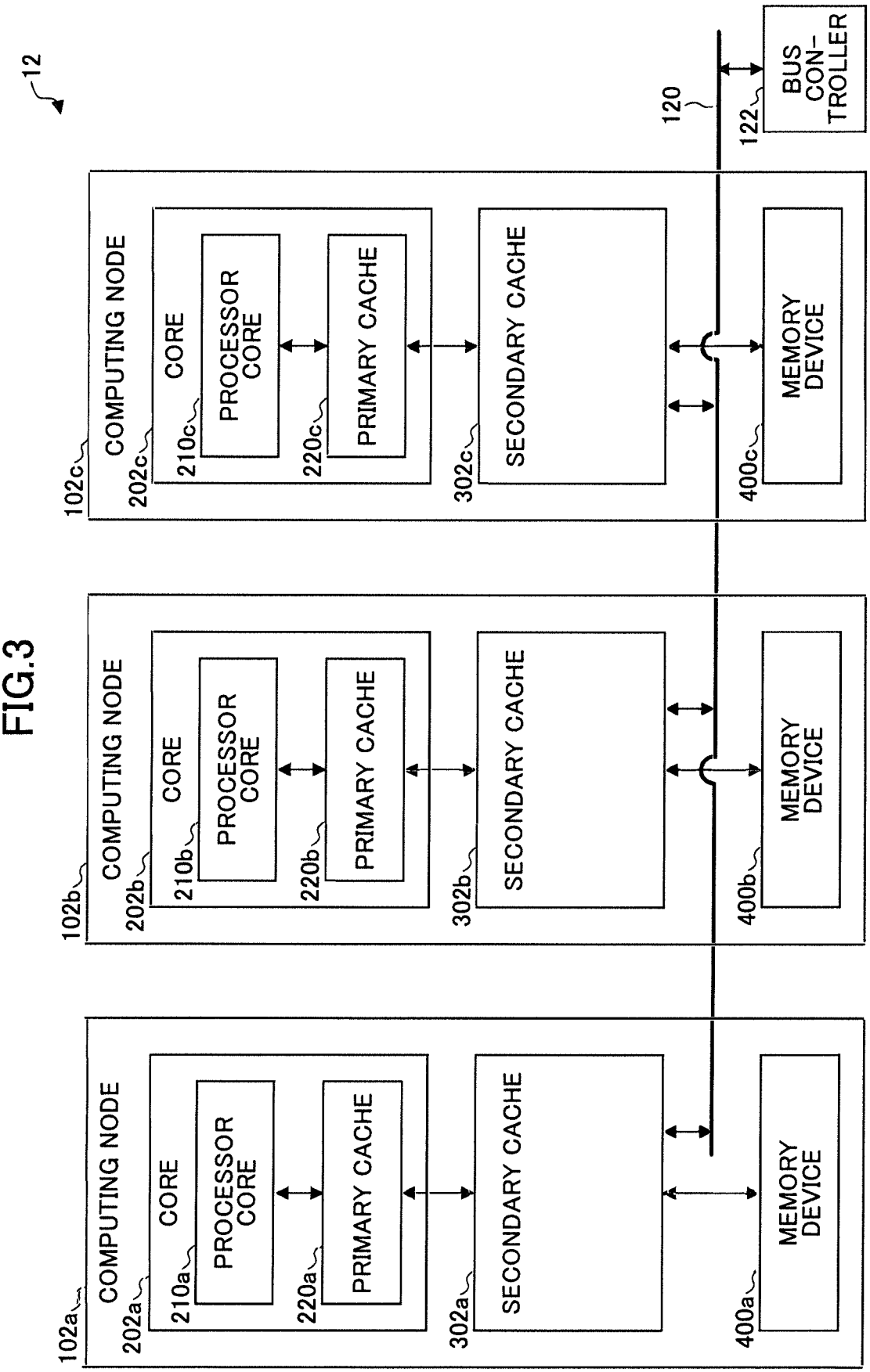
FIG. 3 is a diagram illustrating another embodiment of a processing system and a control method of the processing system.

FIG. 3 is a diagram illustrating another embodiment of a processing system and a control method of the processing system. With respect to the same element as that illustrated in FIG. 1, or with respect to the similar element to that illustrated in FIG. 1, the same or similar reference symbol is attached, and the detailed description of the element will be omitted. A processing system 12 illustrated in FIG. 3 is a processor such as a CPU. The processing system 12 includes multiple computing nodes 102 (102a, 102b, and 102c), multiple memory devices 400 (400a, 400b, and 400c) respectively assigned to the computing nodes 102 (102a, 102b, and 102c), a bus 120 connecting to the multiple computing nodes 102, and a bus controller 122. In the following, a given memory device 400 assigned to a given computing node 102 may be referred to as a "(given) memory device 400 of a (given) computing node 102". The multiple computing nodes 102 are an example of multiple processing units to which multiple memory devices 400 are assigned respectively. Note that the number of the computing nodes 102 is not limited to 3.

In FIG. 3, similar to FIG. 1, to distinguish each of the multiple computing nodes 102 in describing the processing systems 12 or the like, a reference number followed by a lower case letter of an alphabetic character (such as a, b, or c) is used for each of the multiple computing nodes 102. Also, with respect to a reference symbol assigned to each element included in the computing node 102, a same alphabetic character as the alphabetic character assigned to the computing node 102 is attached as a suffix of the reference symbol.

Each of the computing nodes 102 includes a core 202 that includes a processor core 210 such as a CPU core performing an arithmetic operation and a primary cache 220, a secondary cache 302, and a memory device 400 for storing information such as data used by the processor core 210. The processor core 210 is an example of a process execution unit performing arithmetic operation. The secondary cache 302 is an example of a cache memory retaining data stored in the memory device 400 of the resident computing node 102 and retaining fetched data that is taken out from the memory device 400 of the other computing nodes 102 among the multiple computing nodes 102.

The primary cache 220 and the secondary cache 302 are accessible faster than the memory device 400, and stores data used by the processor core 210 of the resident computing node 102. For example, the primary cache 220 is accessible faster than the secondary cache 302, and is placed between the processor core 210 and the secondary cache 302. The primary cache 220 retains part of data retained in the secondary cache 302, and transmits the data requested by an access request received from the processor core 210. When the data requested by the access request is not retained in the primary cache 220 (when cache miss has occurred in the primary cache 220), the primary cache 220 transfers the access request to the secondary cache 302.

The secondary cache 302 has a larger capacity than the primary cache 220, and is placed between the primary cache 220 and the memory device 400. Further, the secondary cache 302 included in each of the computing nodes 100 is connected to the bus 120, and each of the secondary caches 302 is communicable with each other. For example, data stored in the memory device 400 of each computing node 102 is taken out to at least one of the other computing nodes 102 via the secondary cache 302 and the bus 120. The secondary cache 302 of each computing node 102 manages status (such as an exclusive state, a shared state, or an invalid state) of data stored in the memory device 400 of the resident computing node 102.

As described above, the secondary cache 302 retains data that is stored in one of the multiple memory devices 400. An operation performed by the secondary cache 302 is the same as, or similar to, that of the cache memory 300 illustrated in FIG. 1. For example, in the above description of the cache memory 300 in FIG. 1, if the computing node 100, the cache memory 300, and the processor core 200 are respectively deemed to be replaced with the computing node 102, the secondary cache 302, and the core 202, an outline of the operation of the secondary cache 302 can be described. Note that details of the secondary cache 302 will be described below with reference to FIG. 4.

The bus controller 122 controls transmission of information or the like via the bus 120 from each secondary cache 302 to another secondary cache 302, by controlling the bus 120. For example, the bus controller 122 controls the bus 120 such that write back information and crossing information that are directed to a source computing node 102 of fetched data can be delivered to the source computing node 102 in the same order as an order when the write back information and the crossing information are output. The write back information is information instructing to write fetched data back to the memory device 400 of a source computing node 102 of the fetched data, as explained in the description of FIG. 1. The crossing information is information indicating occurrence of a crossing in which the secondary cache 302 receives an access request to the fetched data after issuing write back information.

Note that the configuration of the processing system 12 is not limited to the configuration illustrated in FIG. 3. For example, the computing node 102 (processing unit) does not necessarily include the memory device 400. That is, the multiple memory devices 400 that are to be assigned to the multiple computing nodes 102 respectively may be disposed outside the computing nodes 102 or the processing system 12. Also, in each of the computing nodes 102, another cache memory other than the primary cache 220 and the secondary cache 302 may be disposed between the primary cache 220 and the secondary cache 302. Alternatively, the primary cache 220 may be omitted.

Figure 4:
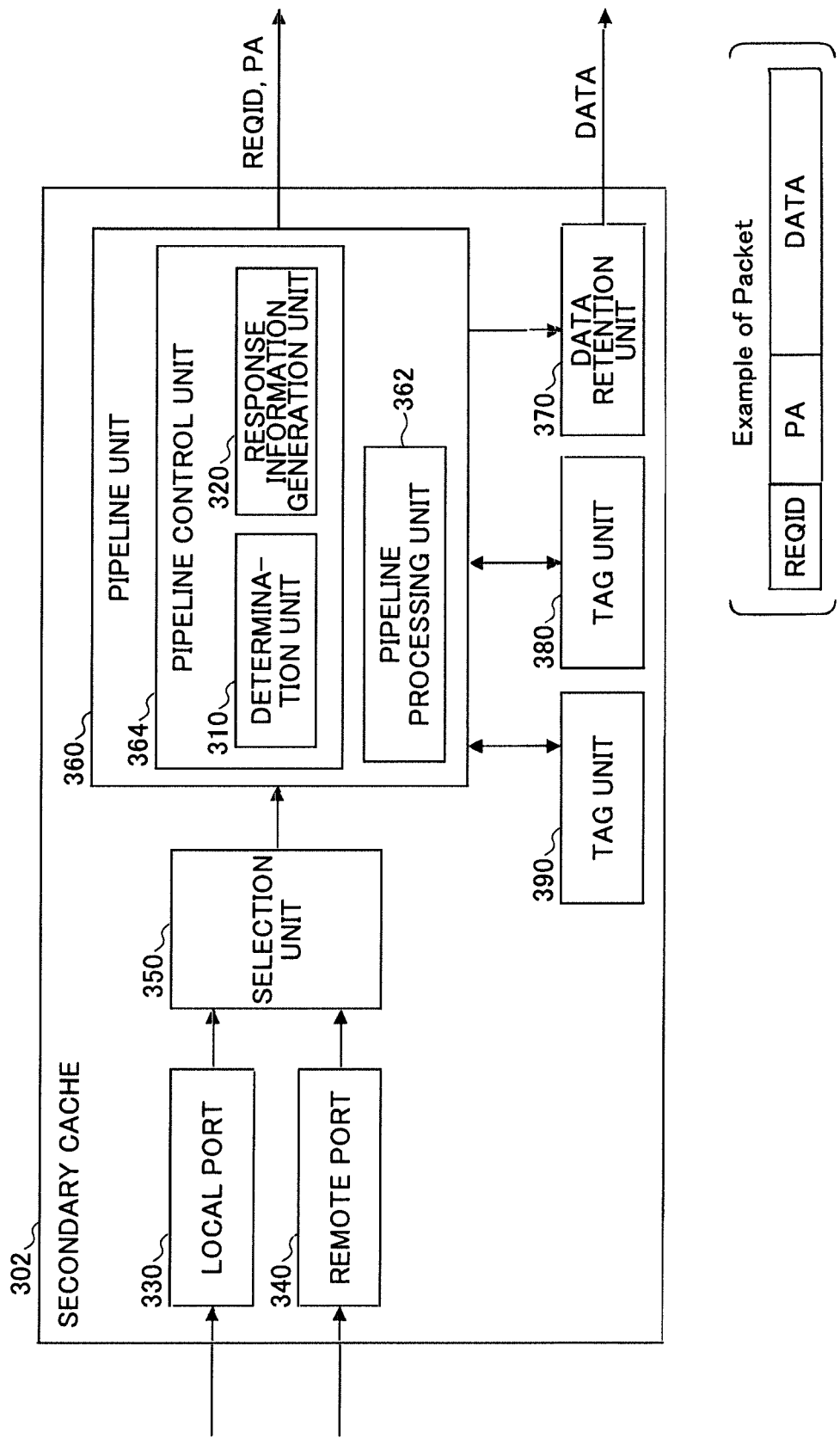
FIG. 4 is a diagram illustrating an example of a secondary cache illustrated in FIG. 3.

FIG. 4 is a diagram illustrating an example of the secondary cache 302 illustrated in FIG. 3. Also in FIG. 4, an example of a packet transmitted or received by the secondary cache 302 is illustrated in brackets. The secondary cache 302 includes a local port 330, a remote port 340, a selection unit 350, a pipeline unit 360, a data retention unit 370, and tag units 380 and 390.

The local port 330 receives a request such as an access request from a resident computing node 102. The remote port 340 receives a request such as an access request from other computing nodes 102. The selection unit 350 selects a request received from either the local port 330 or the remote port 340, and passes the selected request to the pipeline unit 360.

The pipeline unit 360 includes a pipeline processing unit 362 performing a pipeline processing, and a pipeline control unit 364 controlling the pipeline processing unit 362. The pipeline processing unit 362 performs processes related to a request received from the selection unit 350 sequentially with multiple stages.

The pipeline control unit 364 includes a determination unit 310 and a response information generation unit 320. The determination unit 310 and the response information generation unit 320 are the same as, or similar to, the determination unit 310 and the response information generation unit 320 illustrated in FIG. 1. For example, when the determination unit 310 receives an access request to fetched data from a source computing node 102 of the fetched data, the determination unit 310 determines if a request crossing with respect to the fetched data has occurred. The response information generation unit 320 outputs information representing a response to a request such as an access request, to an issuer of the request such as the computing node 102. For example, when a request crossing with respect to fetched data has occurred, the response information generation unit 320 outputs crossing information indicating that a request crossing has occurred to a source computing node 102 of the fetched data, as a response to an access request. A symbol REQID in FIG. 4 represents a request such as an access request, or information such as a response to a request (crossing information, or completion information representing a process completion of a process related to a request), and a symbol PA represents a target address of a target of a request (such as an address of request data).

The data retention unit 370 retains data used by the processor core 210 of a resident computing node 102. For example, the data retention unit 370 retains data stored in one of the multiple memory devices 400. A symbol DATA in FIG. 4 represents data such as request data requested by an access request. The secondary cache 302 sends or receives a packet that includes the information REQID, the target address PA, and the data DATA, as illustrated in the brackets of FIG. 4. However, when the data DATA is not required to be sent, such as when a response is to be sent, the data DATA may be omitted from the packet. In the following, the packet that is sent or received by the secondary cache 302 may be called by a name of information specified by the information REQID (access request, crossing information, completion information, or the like).

The tag unit 380 retains information representing status of data retained in the data retention unit 370. In MESI protocol, data is categorized into the following four states: "Modified", "Exclusive", "Shared", and "Invalid". For example, a state of dirty data updated by the processor core 210 or the like of a resident computing node 102 is categorized as "Modified". Further, a state of clean data not having been updated that is retained in one of the multiple secondary caches 302 is categorized as "Exclusive". Further, a state of clean data retained in the multiple secondary caches 302 is categorized as "Shared".

The tag unit 390 retains information representing status (such as an exclusive state, a shared state, or an invalid state) of data stored in the memory device 400 of a resident computing node 102. As mentioned in the description of FIG. 1, the exclusive state does not necessarily mean that data is not updated. That is, with respect to a state of data stored in the memory device 400, the exclusive state includes the "Modified" state in MESI protocol.

FIG. 5 is a diagram illustrating an example of an operation of the processing system 12 illustrated in FIG. 3. The operation illustrated in FIG. 5 is an aspect of a control method of the processing system. The operation illustrated in FIG. 5 is an example of an operation of the secondary cache 302 that has received an access request from either a resident computing node 102 or one of the other computing nodes 102. Every time the secondary cache 302 receives an access request, the secondary cache 302 performs step S100 and thereafter.

At step S100, the pipeline unit 360 searches the tag unit 380 to determine if the data retention unit 370 retains request data requested by the access request.

Next, at step S200, the pipeline unit 360 determines if a cache hit occurs in the secondary cache 302. If the cache hit occurs in the secondary cache 302, that is, if the data retention unit 370 retains the request data, the operation of the secondary cache 302 proceeds to step S210. On the other hand, if a cache miss occurs in the secondary cache 302, that is, if the data retention unit 370 does not retain the request data, the operation of the secondary cache 302 proceeds to step S300.

At step S210, the pipeline unit 360 determines if the access request to be processed is received from the local port 330 or not. If the access request to be processed is an access request received from the local port 330, that is, if the access request to be processed is an access request received from the resident computing node 102, the operation of the secondary cache 302 proceeds to step S220. If the access request to be processed is an access request received from the remote port 340, that is, if the access request to be processed is an access request received from another computing node 102, the operation of the secondary cache 302 proceeds to step S230.

At step S220, the secondary cache 302 issues completion information containing request data that is read out from the data retention unit 370, to the resident computing node 102 (a computing node 102 that has issued the access request). Note that the completion information is a response to the access request, and indicates a completion of a process related to the access request.

As described above, the secondary cache 302 outputs the request data retained in the data retention unit 370 to the core 202 of the resident computing node 102 if the data retention unit 370 retains the request data requested by the access request from the resident computing node 102, and terminates the process.

At step S230, the secondary cache 302 issues completion information containing the request data that is read out from the data retention unit 370, to the computing node 102 which is a source of the access request (another computing node 102). If the access request is a read request or the like for exclusively reading data, the secondary cache 302 discards the request data from the data retention unit 370.

When step S230 is completed, the operation of the secondary cache 302, in a case in which the data retention unit 370 retains request data requested by an access request from another computing node 102, terminates. If request data is not retained in the data retention unit 370, step S300 is executed, as mentioned above.

At step S300, the pipeline unit 360 determines if the access request to be processed is received from the local port 330 or not. If the access request to be processed is an access request received from the local port 330, that is, if the access request to be processed is an access request received from the resident computing node 102, the operation of the secondary cache 302 proceeds to step S310. If the access request to be processed is an access request received from the remote port 340, that is, if the access request to be processed is an access request received from another computing node 102, the operation of the secondary cache 302 proceeds to step S400.

At step S310, the secondary cache 302 issues a read request for reading the request data requested by the access request, to the memory device 400 of the resident computing node 102 or to another computing node 102. For example, the secondary cache 302 issues a read request for the request data to the memory device 400 of the resident computing node 102 if the request data is stored in the memory device 400 of the resident computing node 102. However, if the request data is taken out from the memory device 400 of the resident computing node 102 to another computing node 102, the secondary cache 302 issues a read request for the request data to the computing node 102 to which the request data is taken out. Further, if the request data is stored in the memory device 400 in another computing node 102, the secondary cache 302 issues a read request for the request data to a computing node 102 managing the request data (another computing node 102).

The secondary cache 302 obtains the request data by performing step S310. Subsequently, the secondary cache 302 sends the obtained request data to the core 202 of the resident computing node 102, and terminates the process.

At step S400, the secondary cache 302 (or more precisely, the determination unit 310) determines if a request crossing has occurred or not. For example, if the request data is data that should be stored in the memory device 400 of another computing node 102, the request data is fetched data taken out from the memory device 400 of another computing node 102. If the request data is not retained in the data retention unit 370 despite the request data being fetched data, it means that the request data is discarded from the secondary cache 302 before the secondary cache 302 receives the access request. That is, if the request data is not retained in the data retention unit 370 despite the request data being fetched data, it means that a request crossing has occurred. Therefore, if the request data is data that should be stored in the memory device 400 of another computing node 102, the determination unit 310 determines that a request crossing has occurred.

When the request crossing has occurred, the operation of the computing node 102 proceeds to step S420. When the request crossing does not occur, the operation of the computing node 102 proceeds to step S410.

At step S410, the secondary cache 302 issues a read request for reading the request data requested by the access request, to the memory device 400 of the resident computing node 102. That is, the secondary cache 302 reads out the request data from the memory device 400 of the resident computing node 102. Subsequently, the secondary cache 302 outputs the request data that was read from the memory device 400 of the resident computing node 102 to the computing node 102 from which the access request was issued, and terminates the process.

At step S420, the secondary cache 302 (or more precisely, the response information generation unit 320) issues crossing information indicating that a request crossing has occurred, to the computing node 102 from which the access request was issued, and terminates the process. When a request crossing occurs, request data is fetched data. Accordingly, the computing node 102 from which the access request was issued is a source computing node 102 of the request data (fetched data).

The computing node 102 having received the crossing information reads out the fetched data (data requested by the access request) that was written back to the memory device 400 of the resident computing node 102, as illustrated in FIG. 6. As a result, cache coherency can be maintained even when a request crossing has occurred. Note that the operation of the processing system 12 is not limited to the example illustrated in FIG. 5.

FIG. 6 is a diagram illustrating an example of an operation of the processing system 12 when a request crossing has occurred. In the example illustrated in FIG. 6, request data to be accessed is, data stored at address A of the memory device 400a of the computing node 102a, and data stored at address B of the memory device 400a of the computing node 102a. The computing node 102a storing the request data in the memory device 400 of the computing node 102a (memory device 400a) is a memory management node of the request data at address A and address B, and may be referred to as home. A computing node 102 including a secondary cache 302 from which a request such as an access request is issued may be referred to as local. Further, a computing node 102 which is not local may be referred to as remote. The local computing node 102 may serve as a home computing node 102. Further, a remote computing node 102 may serve as a home computing node 102.

First, the pipeline unit 360 of the computing node 102b (local) receives a read request READ[B] for reading data at address B, from the resident computing node 102b. Next, the pipeline unit 360 of the computing node 102b requests the tag unit 380 of the resident computing node 102b to read data at address B ((P10) in FIG. 6).

Because the data retention unit 370 of the computing node 102b does not retain data at address B, a cache miss occurs in the secondary cache 302b of the computing node 102b ((P11) in FIG. 6). Therefore, the secondary cache 302b of the computing node 102b issues the read request READ[B] to the computing node 102a (home).

The pipeline unit 360 of the computing node 102a (home) receives the read request READ[B] from the computing node 102b ((P12) in FIG. 6). Subsequently, the pipeline unit 360 of the computing node 102a (home) performs data read at address B, and outputs read completion information including data at address B (RCPLT[B]) to the computing node 102b.

The pipeline unit 360 of the computing node 102b stores the data at address B included in the read completion information RCPLT[B] into the data retention unit 370 of the resident computing node 102b ((P13) in FIG. 6).

When there is no free area for storing data in the data retention unit 370 of the computing node 102b, the pipeline unit 360 of the computing node 102b performs write-back operation to write data back to the memory device 400 before receiving the read completion information RCPLT[B], in order to allocate free area. In the example illustrated in FIG. 6, the pipeline unit 360 of the computing node 102b issues write back information WRKB[A] to instruct to write data at address A back to the memory device 400a of the computing node 102a (home) ((P20) in FIG. 6).

In response to an issuance of the write back information, the tag unit 380 of the computing node 102b performs write-back operation of data at address A ((P21) in FIG. 6). As a result, the data at address A is discarded from the data retention unit 370 of the computing node 102b (local), and is written back to the memory device 400a of the computing node 102a (home) ((P22) in FIG. 6). For example, when the data at address A is in dirty state, write back information WRKB[A] including the data at address A is output from the computing node 102b to the computing node 102a. When the data at address A is in clean state, write back information WRKB[A] not including the data at address A may be issued from the computing node 102b to the computing node 102a.

Further, in the example illustrated in FIG. 6, the pipeline unit 360 of the computing node 102a receives a read request READ[A] for exclusively reading data at address A from the core 202a of the resident computing node 102a, before receiving the write back information WRKB[A] from the computing node 102b. Though the data at address A is discarded from the secondary cache 302b of the computing node 102b, the write back information WRKB[A] has not arrived at the computing node 102a. Therefore, the computing node 102a recognizes that the data at address A is retained in the secondary cache 302b of the computing node 102b, and the pipeline unit 360 of the computing node 102a issues a read request READ[A] for exclusively reading the data at address A to the computing node 102b ((P30) in FIG. 6).

When the computing node 102a accesses the data at address A that was taken out to another computing node 102b, in order to avoid occurrence of inconsistency, the pipeline unit 360 of the computing node 102a (home) prohibits update of a content at address A of the memory device 400a by acquiring lock, until a response is returned ((P31) in FIG. 6). However, data update by the write back information WRKB[A] is allowed even while the lock is being acquired. Accordingly, as mentioned above, the data at address A that was discarded from the data retention unit 370 of the computing node 102b (local) is written back to the memory device 400a of the computing node 102a (home) ((P22) in FIG. 6).

The pipeline unit 360 of the computing node 102b having received the read request READ[A] from the computing node 102a requests the tag unit 380 of the resident computing node 102b to read data at address A ((P32) in FIG. 6). However, because the data at address A has already been discarded from the data retention unit 370 of the computing node 102b, by the write-back operation for writing the data at address A back to the memory device 400a, a cache miss occurs in the secondary cache 302b of the computing node 102b ((P32) in FIG. 6).

Because the cache miss has occurred despite the request data requested by the read request READ[A] being fetched data taken out from the memory device 400a of the computing node 102a, the secondary cache 302b of the computing node 102b determines that a request crossing has occurred. Accordingly, the secondary cache 302b of the computing node 102b issues, to the computing node 102a, crossing information RCPLTcrs[A] indicating that a request crossing has occurred, as a response to the read request READ[A].

As described above, when the secondary cache 302b receives the read request READ[A] from the computing node 102a after issuing the write back information WRKB[A] to the computing node 102a, the secondary cache 302b issues the crossing information RCPLTcrs[A] to the computing node 102a. The pipeline unit 360 of the computing node 102a (home) receives the crossing information RCPLTcrs[A] from the computing node 102b ((P33) in FIG. 6). By receiving this information, the lock for prohibiting data update of address A is released.

Further, the pipeline unit 360 of the computing node 102a having received the crossing information RCPLTcrs[A] recognizes that the latest data at address A requested by issuing the read request READ[A] has been written back to the memory device 400a of the resident computing node 102a. Accordingly, the pipeline unit 360 of the computing node 102a reads the data at address A that was written back to the memory device 400a of the resident computing node 102a. For example, the pipeline unit 360 of the computing node 102a issues the read request READ[A] to the memory device 400a of the resident computing node 102a ((P34) in FIG. 6). Next, the pipeline unit 360 of the computing node 102a receives read completion information RCPLT[A] including the data at address A ((P35) in FIG. 6). By this operation, the data at address A is stored in the secondary cache 302a of the computing node 102a. Then, the secondary cache 302a of the computing node 102a transmits the data at address A to the core 202a of the resident computing node 102a, and the process terminates.

As described above, even when a crossing, such as an event in which the secondary cache 302b receives a read request READ[A] after the secondary cache 302b issues write back information WRKB[A] to the computing node 102a, has occurred, cache coherency can be maintained. That is, even when a request crossing has occurred, by using crossing information RCPLTcrs, cache coherency can be maintained without using a replace buffer 372EX or the like illustrated in FIG. 7.

Suppose that the write back information WRKB[A] was overtaken by the crossing information RCPLTcrs[A]. In this case, after pre-updated data is read out from the memory device 400a, the latest data that was updated by the computing node 102b is written back to the memory device 400a, which means that cache coherency cannot be maintained. Therefore, the bus controller 122 prevents the write back information WRKB[A] from being overtaken by the crossing information RCPLTcrs[A], by controlling transmission of the write back information WRKB[A] and the crossing information RCPLTcrs[A] on the bus 120. By this control, occurrence of an event, in which pre-updated data at address A is read out from the memory device 400a before the latest data at address A is written back to the memory device 400a, can be prevented. That is, cache coherency can be maintained.

The read completion information RCPLT, the crossing information RCPLTcrs, and the like, are information of a type for sending a notification to a requestor that a process concerning a request such as read request READ has been completed. Though the write back information WRKB is information of a type for instructing to write back, the response information generation unit 320 generates the write back information WRKB as information of the same type as the crossing information RCPLTcrs. Since the write back information WRKB and the crossing information RCPLTcrs are in the same type, the bus controller 122 controls transmission of the above information such that the write back information WRKB[A] and the crossing information RCPLTcrs[A] are delivered in the same order as the order in which the write back information WRKB[A] and the crossing information RCPLTcrs[A] are issued. By this control, occurrence of an event in which the write back information WRKB[A] is overtaken by the crossing information RCPLTcrs[A] can be prevented, and therefore, cache coherency can be maintained.

FIG. 7 is a diagram illustrating a comparative example of the secondary cache 302 illustrated in FIG. 4. In FIG. 7, a replace buffer 372EX is added to the secondary cache 302 illustrated in FIG. 4. Also, the secondary cache 302EX includes a pipeline unit 360EX, a data retention unit 370EX, and tag unit 380EX, instead of the pipeline unit 360, the data retention unit 370, and the tag unit 380. Other configurations of the secondary cache 302EX are the same as or similar to the configurations of the secondary cache 302 illustrated in FIG. 4. With respect to the elements same as or similar to those illustrated in FIG. 4, same or similar reference symbols are attached, and detailed description of those elements will be omitted.

The secondary cache 302EX includes a local port 330, a remote port 340, a selection unit 350, the pipeline unit 360EX, the data retention unit 370EX, the replace buffer 372EX, the tag unit 380EX, and a tag unit 390. The local port 330 receives a request such as an access request from a resident computing node 102. The remote port 340 receives a request such as an access request from other computing nodes 102. The selection unit 350 selects a request received from either the local port 330 or the remote port 340, and passes the selected request to the pipeline unit 360EX.

The pipeline unit 360EX includes a pipeline processing unit 362EX performing a pipeline processing, a pipeline control unit 364EX controlling the pipeline processing unit 362EX, and a cancel flag FLG indicating whether write-back is cancelled or not. The pipeline processing unit 362EX performs processes related to a request received from the selection unit 350 sequentially with multiple stages.

The pipeline control unit 364EX does not include the determination unit 310 illustrated in FIG. 4. Further, the pipeline control unit 364EX includes a response information generation unit 320EX for outputting information (REQID, PA) representing a response to a request such as an access request, to a requestor such as the computing node 102, instead of the response information generation unit 320 illustrated in FIG. 4.

The data retention unit 370EX retains data used by the processor core 210 of a resident computing node 102, and outputs data DATA requested by an access request or the like.

When fetched data in the data retention unit 370EX is to be written back to the memory device 400 of a source computing node 102, the replace buffer 372EX retains the fetched data that is to be discarded from the data retention unit 370EX until the fetched data is written back to the memory device 400.

The tag unit 380EX retains information representing status of data retained in the data retention unit 370EX. The tag unit 390 retains information representing status of data stored in the memory device 400 of a resident computing node 102.

If a write-back request of fetched data and an access request for the fetched data cross, the secondary cache 302EX transmits the fetched data retained in the replace buffer 372EX to a computing node 102 from which the access request was issued. Because of the operation, cache coherence can be maintained even when a request crossing has occurred.

FIG. 8 is a diagram illustrating an example of an operation of a processing system including the secondary cache 302EX illustrated in FIG. 7. In the example illustrated in FIG. 8, data at address A and data at address B, which are data to be accessed, are data stored in the memory device 400a of the computing node 102a, similar to FIG. 6.

Operations for reading data at address B based on a read request READ[B] are the same as or similar to the operations illustrated in FIG. 6 ((P10), (P11), (P12), and (P13) in FIG. 8).

To allocate free area, the pipeline unit 360EX of the computing node 102b issues write back information WRKB[A] to instruct to write data at address A back to the memory device 400a of the computing node 102a (home) ((P40) in FIG. 8). In response to the operation, the tag unit 380EX of the computing node 102b performs write-back operation of data at address A ((P41) in FIG. 8). As a result, the data at address A is discarded from the data retention unit 370EX of the computing node 102b (local), and is written to the replace buffer 372EX of the computing node 102b ((P42) in FIG. 8).

Further, when the data at address A is in dirty state, the computing node 102a receives write back information WRKB[A] including the data at address A from the computing node 102b to the computing node 102a ((P43) in FIG. 8). When the data at address A is in clean state, write back information WRKB[A] not including the data at address A may be issued from the computing node 102b to the computing node 102a. In the example illustrated in FIG. 8, the write back information WRKB[A] is generated as a type of information for instructing to write back, which is categorized to a different type from information such as read completion information RCPLT[A] for notifying a requestor that a process concerning a request has been completed.

Further, similar to FIG. 6, the pipeline unit 360 of the computing node 102a receives a read request READ[A] for exclusively reading data at address A from the core 202a of the resident computing node 102a, before receiving the write back information WRKB[A] from the computing node 102b. Though the data at address A is discarded from the secondary cache 302EX of the computing node 102b, the write back information WRKB[A] has not arrived at the computing node 102a. Accordingly, the computing node 102a recognizes that the data at address A is retained in the secondary cache 302EX of the computing node 102b.

Therefore, the pipeline unit 360EX of the computing node 102a issues a read request READ[A] for exclusively reading the data at address A to the computing node 102b ((P50) in FIG. 8). Similar to FIG. 6, the pipeline unit 360EX of the computing node 102a prohibits update of a content at address A by acquiring lock, until a response is returned ((P51) in FIG. 8). Further, the pipeline unit 360EX of the computing node 102a receives the write back information WRKB[A] generated as a type of information for process instruction while the lock is acquired ((P43) in FIG. 8). Accordingly, the pipeline unit 360EX of the computing node 102a does not perform write-back operation of the data at address A, and waits until the lock is released.

The pipeline unit 360EX of the computing node 102b having received the read request READ[A] from the computing node 102a requests the tag unit 380EX of the resident computing node 102b to read data at address A. Because the data at address A has already been discarded from the data retention unit 370EX of the computing node 102b, by the write-back operation for writing the data at address A, a cache miss occurs in the secondary cache 302EX of the computing node 102b ((P52) in FIG. 8).

As described above, the data at address A has been written to the replace buffer 372EX of the computing node 102b ((P42) in FIG. 8). Therefore, the secondary cache 302EX of the computing node 102b outputs the data at address A, retained in the replace buffer 372EX of the resident computing node 102b, to the computing node 102a as read completion information RCPLT[A] ((P53) in FIG. 8).

The pipeline unit 360EX of the computing node 102a having received the read completion information RCPLT[A] releases the lock for the data at address A ((P54) in FIG. 8). Further, the pipeline unit 360EX of the computing node 102a sets a cancel flag FLG to "1" ((P55) in FIG. 8).

Because the cancel flag FLG is "1", the pipeline unit 360EX of the computing node 102a cancels the write-back operation (without performing the write-back operation) even if the lock is released ((P44) in FIG. 8). Further, the pipeline unit 360EX of the computing node 102a sets a cancel flag FLG to "0" as the write-back operation was cancelled ((P56) in FIG. 8). The pipeline unit 360EX of the computing node 102a also outputs, as a response to the write back information WRKB[A], write completion information WBCPLT[A] indicating that the write-back operation of the data at address A was cancelled, to the computing node 102b.

The replace buffer 372EX of the computing node 102b having received the write completion information WBCPLT[A] discards the data at address A. In response to the deletion, the operations of the computing nodes 102a and 102b terminate.

As described above, even when a request crossing had occurred, cache coherency can be maintained by transmitting request data from the replace buffer 372EX to a requestor. On the other hand, if a secondary cache in which the replace buffer 372EX is omitted from the secondary cache 302EX were to be used, when a cache miss occurred in the secondary cache of the computing node 102b having received a read request READ[A], the secondary cache would not be able to return data to the computing node 102a. Therefore in this case, a process flow concerning the read request READ[A] would stop, and cache coherency would not be maintained. Further, if a secondary cache in which the cancel flag FLG is omitted from the secondary cache 302EX were to be used, a case might happen in which pre-update data at address is written-back after receiving read completion information RCPLT[A] including the latest data at address A.

If the secondary cache 302EX having the replace buffer 372EX and the cancel flag FLG is to be used, cache coherency can be maintained even when a request crossing has occurred. However, a size of a circuit of the secondary cache 302EX becomes larger than the secondary cache 302 illustrated in FIG. 4. In other words, the processing system 12 implementing cache coherency control using crossing information RCPLTcrs can control against increase of a size of a circuit, as compared to the case in which the replace buffer 372EX or the like is used. Accordingly, the processing system 12 can reduce a size of the circuit.

As described above, in the embodiment illustrated in FIGS. 3 to 6, effects similar to those described in the embodiment illustrated in FIG. 1 and FIG. 2 can be obtained. For example, the determination unit 310 of the secondary cache 302 determines if a request crossing with respect to fetched data has occurred. Also, the response information generation unit 320 of the secondary cache 302 outputs crossing information RCPLTcrs indicating that a request crossing has occurred to a computing node 102 of an access request source (that is, a source computing node 102 of the fetched data). As the above operation is performed, the computing node 102 of an access request source can recognize that a request crossing has occurred with respect to data requested by the access request, and can read the latest data (correct data) from the memory device 400 of its own computing node 102. As a result, cache coherency can be maintained even when a request crossing has occurred.

Further, by performing cache coherency control using crossing information RCPLTcrs, a size of a circuit for cache coherency control can be reduced as compared to the case in which the replace buffer 372EX is used for cache coherency control. That is, a size of a circuit of the processing system 12 supporting cache coherency control can be reduced. Also, because a size of a circuit for cache coherency control is reduced, power consumption of the processing system 12 can be reduced. Also, because a size of a circuit for cache coherency control is reduced, a manufacturing cost of the processing system 12 can be reduced.

Further, the bus controller 122 controls the bus 120 such that write back information WRKB and crossing information RCPLTcrs that are issued to a source computing node 102 (a computing node 102 from which fetched data is taken out) can be delivered to the source computing node 102 in the same order as an order when the write back information and the crossing information is output. By this control, occurrence of an event, in which pre-updated fetched data is read out from the memory device 400 before updated fetched data is written back to the memory device 400, can be prevented. That is, cache coherency can be maintained.

According to the above detailed description, specific features and advantages of the embodiments will be made clear. This is intended so that claims extend to the above mentioned specific features and advantages of the embodiments without departing from the spirit and scope of the invention. Further, a person having ordinary skill in the art should be able to conceive various enhancements and alterations easily. Accordingly, the above embodiments are not intended to limit scope of inventive embodiments to the extent described in the above embodiments, but the scope may include an enhanced product or an equivalent product.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A processing system including a plurality of processing units, each of the plurality of processing units being connected to a corresponding memory device of a plurality of memory devices, each of the plurality of memory devices being physically independent, and each of the plurality of processing units comprising:
   a process execution unit configured to perform an arithmetic operation; and
   a cache memory configured to retain data stored in a memory device connected to a same processing unit in which the cache memory resides, and to retain fetched data taken out from a memory device connected to a processing unit other than the same processing unit, the cache memory including
   a determination unit configured, in response to receiving an access request for the fetched data from a source processing unit from which the fetched data has been taken out, to determine occurrence of a crossing, in which the access request is received after the cache memory issues write back information instructing to write the fetched data back to the memory device connected to the source processing unit; and
   a response information generation unit configured to output, in response to the occurrence of the crossing, crossing information indicating that the crossing has occurred, as a response to the access request, to the source processing unit; wherein the processing system further includes
   a bus connecting the cache memories in the plurality of the processing units with each other; and
   a bus controller configured to control the bus such that the write back information and the crossing information issued to the source processing unit can be delivered to the source processing unit in a same order as an output order of the write back information and the crossing information, in order to avoid occurrence of an event in which the write back information is overtaken by the crossing information.

2. The processing system according to claim 1, wherein the determination unit is configured to determine that the crossing has occurred, in a case in which the fetched data requested by the access request from the source processing unit is not retained in the cache memory where the determination unit resides.

3. The processing system according to claim 1,
   wherein the cache memory in the source processing unit is configured, in response to receiving the crossing information as the response to the access request, to read out the fetched data having been written back to the memory device connected to the source processing unit.

4. A control method of a processing system including a plurality of processing units each including a cache memory, and a bus connecting the cache memories in the plurality of the processing units with each other, each of the plurality of processing units being connected to a corresponding memory device of a plurality of memory devices, each of the plurality of memory devices being physically independent, the method comprising:
   performing an arithmetic operation by the processing unit;
   retaining, by the cache memory, data stored in a memory device connected to a same processing unit in which the cache memory resides, and fetched data taken out from a memory device connected to a processing unit other than the same processing unit;
   in response to receiving an access request for the fetched data from a source processing unit from which the fetched data has been taken out, by a determination unit in the cache memory, determining occurrence of a crossing, in which the access request is received after the cache memory issues write back information instructing to write the fetched data back to the memory device connected to the source processing unit; and
   in response to occurrence of the crossing, by a response information generation unit in the cache memory, outputting crossing information indicating that the crossing has occurred, as a response to the access request, to the source processing unit; wherein
   transmission of the crossing information and the write back information is controlled by a bus controller such that the write back information and the crossing information issued to the source processing unit can be delivered to the source processing unit in a same order as an output order of the write back information and the crossing information, in order to avoid occurrence of an event in which the write back information is overtaken by the crossing information.

* * * * *